(12) United States Patent
Targosz

(10) Patent No.: US 7,327,136 B2
(45) Date of Patent: *Feb. 5, 2008

(54) MAGNETIC TAGGANT SYSTEM

(76) Inventor: Thomas Targosz, 36722 Green St., New Baltimore, MI (US) 48047

( * ) Notice: Subject to any disclaimer, the term of this patent is extended or adjusted under 35 U.S.C. 154(b) by 0 days.

This patent is subject to a terminal disclaimer.

(21) Appl. No.: 11/608,979

(22) Filed: Dec. 11, 2006

(65) Prior Publication Data

US 2007/0080678 A1  Apr. 12, 2007

Related U.S. Application Data

(63) Continuation-in-part of application No. 10/808,750, filed on Mar. 25, 2004, now Pat. No. 7,148,678.

(60) Provisional application No. 60/803,140, filed on May 25, 2006.

(51) Int. Cl.
  *G01N 27/74* (2006.01)
  *G01R 33/12* (2006.01)
(52) U.S. Cl. .............. 324/204; 73/61.42; 73/53.07
(58) Field of Classification Search ........... 324/204; 73/61.42, 53.07
  See application file for complete search history.

(56) References Cited

U.S. PATENT DOCUMENTS 5,831,151 A * 11/1998 Ondrus et al. ............ 73/61.41

* cited by examiner

*Primary Examiner*—Reena Aurora
(74) *Attorney, Agent, or Firm*—Fraser Clemens Martin & Miller LLC; William J. Clemens

(57) ABSTRACT

An apparatus and a method for monitoring a ratio of at least two components being mixed use sensors detecting ferrous taggant particles in the component(s) and the mixture. The sensors include an annular drive coil positioned between inner and outer annular sense coils all surrounding a passage for material being sensed. The ratio is determined by comparing a signal generated by one sensor through which a taggant particle containing component is flowing with a signal generated by another sensor through which the mixture is flowing delayed by the time required for the component to flow from the one sensor to the another sensor. The signals can also be used to control the flow of the components and to check the mixture after use.

4 Claims, 7 Drawing Sheets

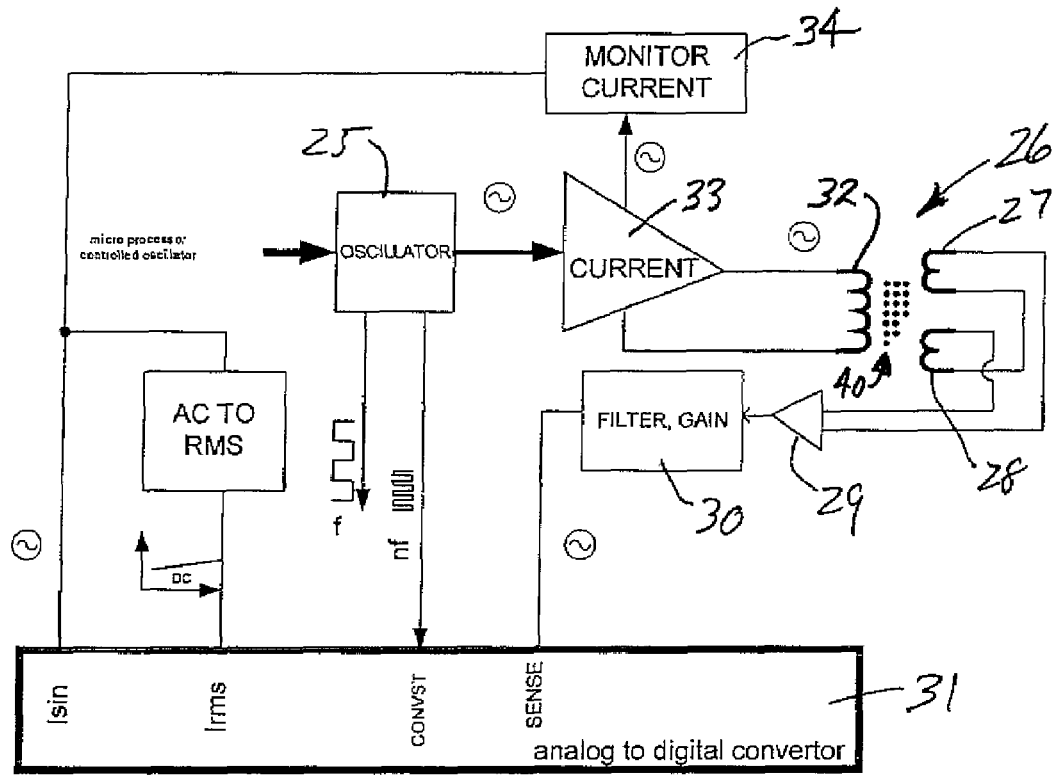
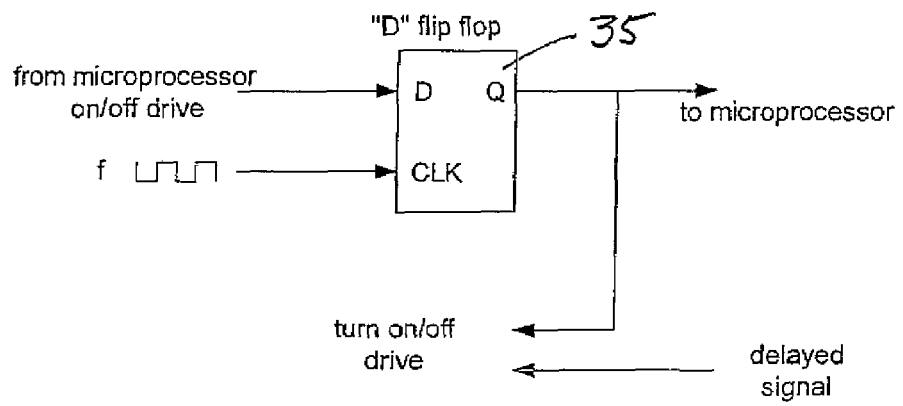
Fig. 3

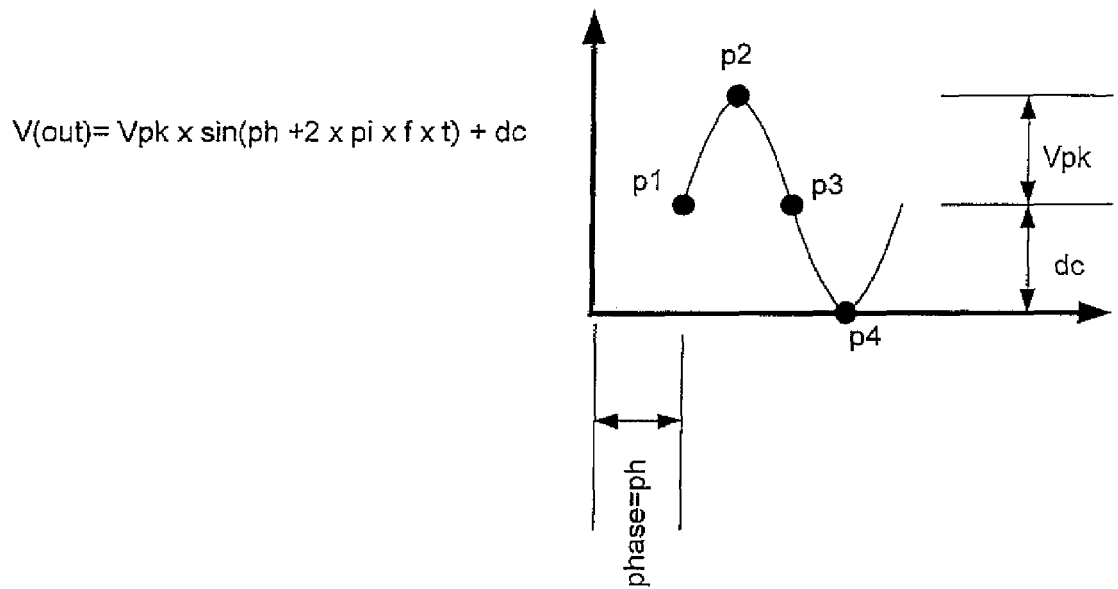

$V(out) = V_{pk} \times \sin(ph + 2 \times pi \times f \times t) + dc$ $p1 = V_{pk} \times \sin(phase) + dc$
$p2 = V_{pk} \times \sin(phase + 90) + dc = V_{pk} \times \cos(phase) + dc$
$p3 = V_{pk} \times \sin(phase + 180) + dc = -V_{pk} \times \sin(phase) + dc$
$p4 = V_{pk} \times \sin(phase + 270) + dc = -V_{pk} \times \cos(phase) + dc$ $p1 - p3 = 2 \times V_{pk} \times \sin(phase)$
$p2 - p4 = 2 \times V_{pk} \times \cos(phase)$ $phase = atan(p1-p3)/(p2-p4)$ $V_{pk} = (p1-p3)/\sin(phase)$

Fig. 4

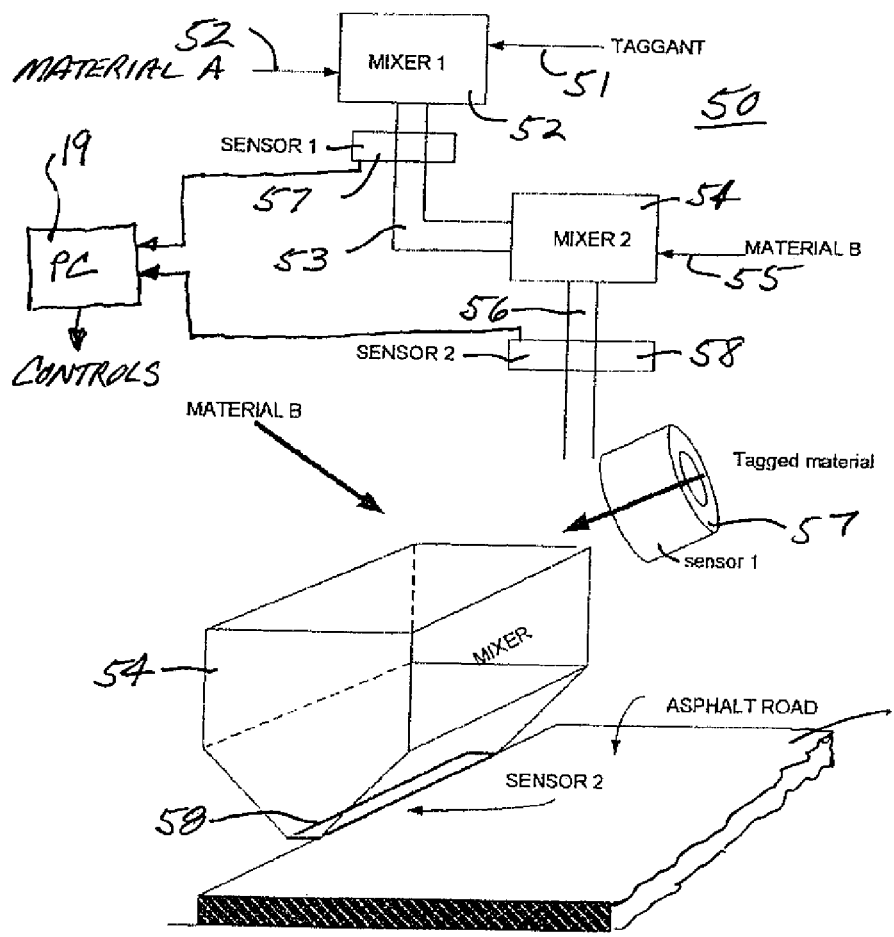
Fig. 8a
Fig. 8b
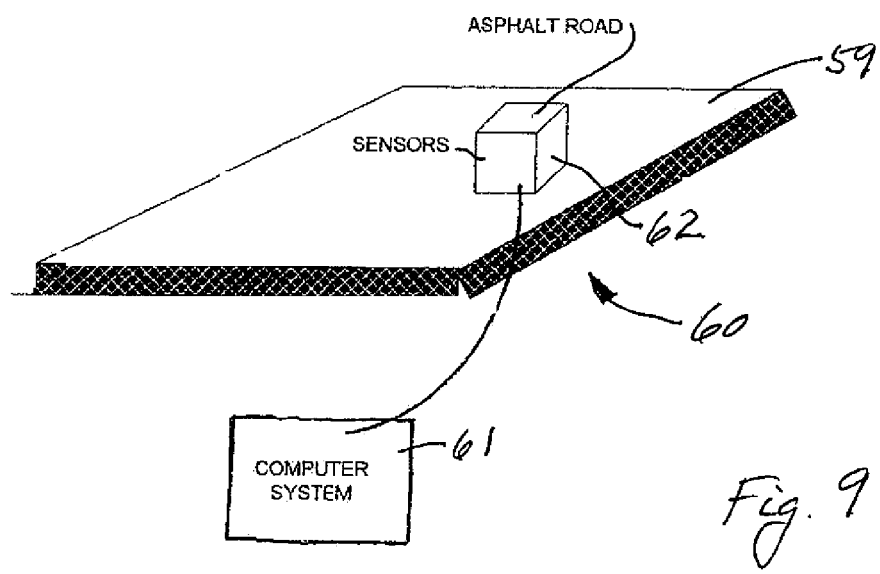
Fig. 9

MAGNETIC TAGGANT SYSTEM

CROSS-REFERENCE TO RELATED APPLICATION

This application is a continuation-in-part of U.S. patent application Ser. No. 10/808,750 filed on Mar. 25, 2004, now U.S. Pat. No. 7,148,678, and claims the benefit of U.S. provisional patent application Ser. No. 60/803,140 filed May 25, 2006.

BACKGROUND OF THE INVENTION

The present invention relates generally to an apparatus for detecting taggants and, in particular, to a system for monitoring the ratio of mixtures formed from two or more parts.

Two-part adhesives, mixed at the time of use, are well known and are used throughout many industries to bond components together. Such adhesives exhibit a faster dry time, longer shelf life, and stronger adhesive characteristics than typical one part adhesives. One requirement of two-part adhesives is to keep the mixture of the parts at the correct ratio to obtain a reaction that will correctly form the adhesive. It often is difficult to monitor the mixing ratio in a production setting where the adhesive parts are being mixed and dispensed as needed on a manufacturing line.

A system and a method for monitoring the proportional volume of constituents provided to an adhesive mixture are shown in the U.S. Pat. No. 5,831,151. Ferromagnetic tagging material particles are suspended in one of the two constituent parts used in the mixture. A first tagging material sensor is utilized to monitor the flow of the tagged part to the mixing area and a second tagging material sensor is utilized to monitor the mixed parts as they flow to a dispenser nozzle. A monitor calculates the volumetric ratio of the two constituents based upon the concentration of the tagging material and a warning is given when the calculated ratio exceeds predetermined limits. Although the preferred embodiment of the present invention is discussed in terms of a two component mixture, this system can be used with more than two component mixtures.

SUMMARY OF THE INVENTION

The present invention concerns a ferrous magnetic taggant system for monitoring a ratio of at least two components being combined in a mixture. The system comprises: a first sensor for generating a first sense signal representing an amount of ferrous taggant particles per unit volume of a first component flowing adjacent the first sensor; a second sensor for generating a second sense signal representing an amount of ferrous taggant particles per unit volume of a mixture of the first component and a ferrous taggant particle free second component flowing adjacent the second sensor; and a control means responsive to the first and second sense signals for calculating a ratio of the volumes of the first and second components in the mixture. The first and second sensors have a generally tubular body with a central passage through which material flows, an inner sense coil extending about a circumference of the passage, a drive coil extending about a circumference of the inner sense coil, and an outer sense coil extending about a circumference of the drive coil. The inner and outer sense coils each generate a coil signal in response to the presence of the ferrous taggant particles. The system includes an instrumentation amplifier connected to the inner and outer sense coils for generating a sense signal representing a difference between the coil signals, the sense signal being one of the first and second sense signals. The control means is connected to an information processing device and generates an output signal representing the ratio of the volumes to the information processing device.

The system includes a master for calibrating the first and second sensors, which each have a passage through which material flows. The master has a body with a smaller diameter end sized to fit into the passages and a larger diameter end sized for use as a handle. The body further having a core formed from a filler material and a predetermined percentage of the ferrous taggant particles.

The present invention also relates to a method of monitoring a volume ratio of at least two components mixed together comprising the steps of: providing a first sensor for generating a first sense signal representing an amount of ferrous taggant particles per unit volume of a first component flowing into a mixing device; providing a second sensor generating a second sense signal representing an amount of ferrous taggant particles per unit volume of a mixture of the first component and a ferrous taggant particle free second component flowing in the mixing device; and providing control means for calculating a ratio of the volumes of the first and second components in the mixture. The method further includes a step of operating the control means to compare a value of the first sense signal with a value of the second sense generated after a predetermined delay representing a time required for a portion of the first component to travel from the first sensor to the second sensor.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a circuit schematic for the sensor shown in FIG. 2;

FIG. 4 is a wave form diagram of the sampling of the current signal generated by the circuit shown in FIG. 3;

FIG. 8a is a schematic view of a magnetic taggant system according to the present invention for mixing asphalt;

FIG. 8b is a perspective view of a portion of the system shown in FIG. 8a;

FIG. 9 is a view of a checking system according to the present invention for verifying the asphalt mixture forming the road;

DESCRIPTION OF THE PREFERRED EMBODIMENT

U.S. provisional patent application Ser. No. 60/803,140 filed May 25, 2006 is hereby incorporated herein by reference.

Figure 1:
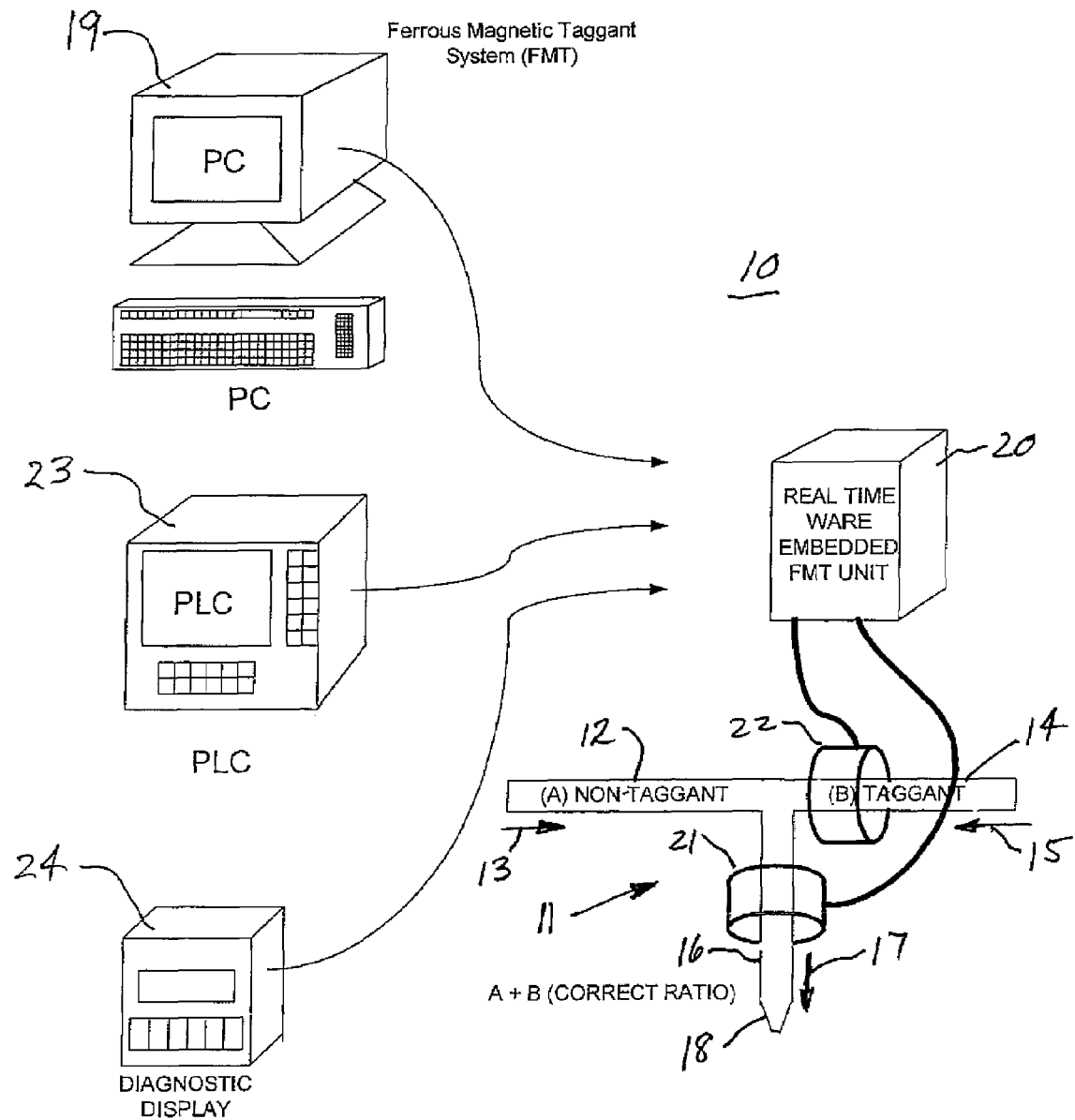
FIG. 1 is a schematic view of a magnetic taggant system in accordance with the present invention.

The present invention concerns a system for monitoring the mixing of two or more constituents to form a mixture in a desired ratio of the components. Although a two-part adhesive, a component "A" and a component "B", is used as an example in the following description of the invention, other mixtures of three or more components that either normally include or can have added thereto a metallic component that affects a magnetic field can be used with the system according to the present invention. A system 10 according to the present invention is shown in FIG. 1 as monitoring a two component mixing and dispensing apparatus 11. The apparatus 11 includes a component "A" source 12 through which flows the component "A" in the direction of an arrow 13. The apparatus 11 also includes a component "B" source 14 through which flows the component "B" in the direction of an arrow 15. The sources 12 and 14 are connected to a mixing tube 16 wherein the two components mix and through which the mixture flows in a direction of an arrow 17 to a dispensing nozzle 18. Although not shown, a conventional mixing element is positioned inside the mixing tube 16.

The system 10 includes a control means such as an electronic instrument 20 connected to two sensors referred to as sensor "A" 21 and sensor "B" 22. The sensor "B" 22 is mounted in such a manner that the component "B", carrying a constant known amount of ferrous taggant particles per unit volume, flows through the center of the sensor "B" 22. Thus, the sensor "B" 22 determines that a desired amount of taggant particles is flowing. The component "A" has no ferrous particles. When the two components are mixed in the mixing tube 16, the mixture of "A"+"B" results and flows through the center of the sensor "A" 21 to the dispenser nozzle 18. The instrument 20 can be connected to one or more information processing devices such as a personal computer PC 19, a programmable logic controller PLC 23 and a diagnostic display 24. These devices provide information as to the operation of the apparatus 11 and can use the information generated by the instrument 20 in a feedback control system to automatically adjust the flow of the "A" and "B" components from the sources 12 and 14 respectively.

The passage of the ferrous taggant particles is detected by the sensors 21 and 22 which each send a sensor signal to the electronic instrument 20. After demodulation of the sensor signal from the coil "B", a linear output signal proportional to the amount of ferrous taggant particles is generated by the electronic instrument 20. A delay representing the time required for the portion of the component "B" previously measured with the sensor "B" 22 to move within the sensor "A" 21 is required. This delay allows the taggant component "B" to mix with the non-taggant component "A" and move within the sensor "A" 21. This will assure testing of the adhesive before and after it is mixed. The change in electrical response has been determined to be linear with respect to amount of taggant. This simplifies the ratio equations. Using a deviation from a desired ratio will further eliminate errors due to different mixtures of the component "B". If for instance the mixture has been reduced by ten percent, the readings of both the sensor "A" 21 and the sensor "B" 22 will be reduced proportionally. Thus, the mixture will still have the correct ratio. The absolute reading of the sensor "B" 22 also is monitored to assure the mixture is held within a certain percent.

EQUATION OF THE LINE: % TAGGANT=$M \times X + B$ EQUATIONS:

M: slope of a line. This is adjusted with each system.

X: amplitude of the sine wave response from the A/D converter. This could also be the phase.

B: offset. This is effected by the external environment. This effect is cancelled when the coil is positioned on a production system.

$R = \% A / \% B$

RATIO (DEVIATION FROM NOMINAL)=$100(((R/(R-1)0.5)-1)$

The constant "0.5" is dependent on the desired mix ratio. A "0.5" constant indicates two parts of the component "A" for every one part of the taggant "B". The above formula is specific to a 2:1 mixture and would be varied according to the mixture ratio be measured.

One method for making the small taggant particles is practiced by 3M, St. Paul, Minn. Small plastic balls 40 (FIG. 2) are plated with a ferrous material. This plating is noticed by an alternating magnetic field. Two effects occur: 1) the flux lines of the magnetic field are altered proportionally to the amount of the balls 40; and 2) small eddy currents are created within each ball 40 wherein these eddy currents oppose the initial magnetic field and effect the return response of the sense windings of the sensors 21, 22.

The sensors "A" 21 and "B" 22 are made as similar as possible to cancel out variations due to the environment. By mathematically ratioing the effect to the magnetic field, the two coils cancel many common environment changes.

The present technology uses the small plated balls 40. Other taggant material may be possible. Any material affecting the magnetic field has the potential to be used.

Figure 2:
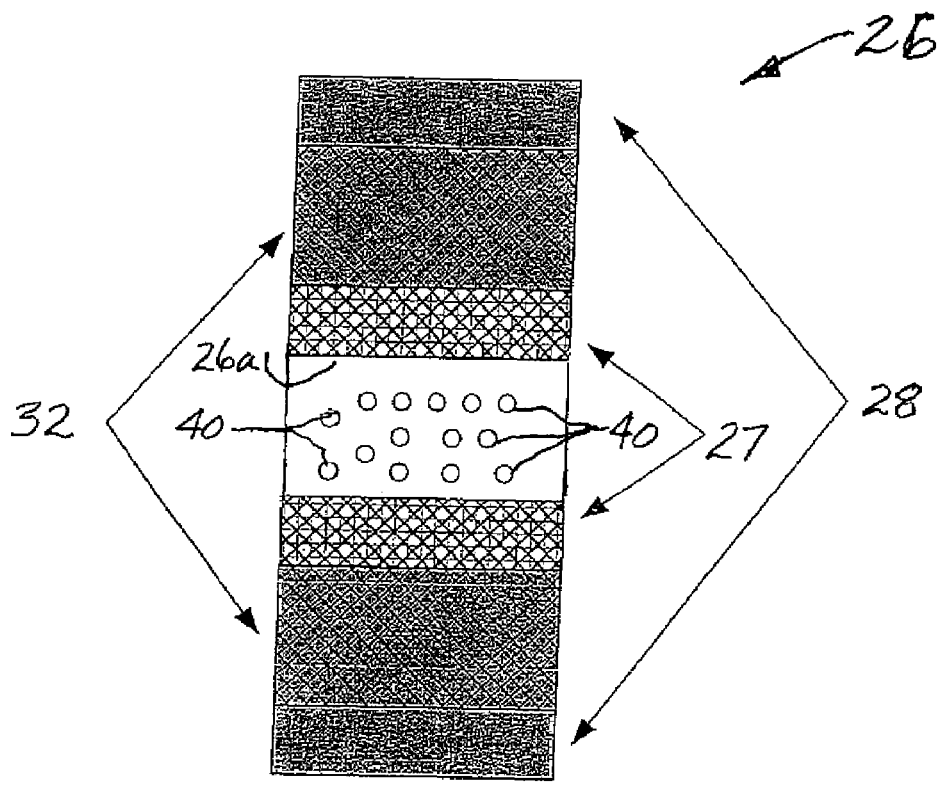
FIG. 2 is cross sectional view of a sensor used in the system shown in FIG. 1.

There is shown in FIG. 2 a sensor 26 that is suitable for use as the sensors 21 and 22. The sensor 26 is tubular in cross section with a hollow interior passage 26a through which the material carrying the balls 40 flows. Extending about a circumference of the interior passage 26a is an inner sense coil 27. Extending about a circumference of the inner sense coil 27 is a drive coil 32. Extending about a circumference of the drive coil 32 is an outer sense coil 28.

The drive coil 32 creates an AC magnetic field. The two sense windings 27 and 28 are designed so signals from the inner sense coil 27 cancel signals from the outer sense coil 28 when only air is present in the passage 26a. When material enters the passage 26a, the inner sense coil 27 receives a larger signal than the outer sense coil 28. The difference between the signals is detectable through electronics. The effect of the plated balls 40 is proportional to the amount of the balls within the sensor 26. The material used to hold the three windings 27, 28, 32 in place can be one of Delrin, ceramic, nonmagnetic stainless, and titanium. Typically, three bobbins are made, one for each coil, and tightly fit together.

As an alternative, the sensor windings 27 and 28 can be replaced by other types of sensors such as Hall Effect devices.

The electronic circuit connected to the sensor coil 26 is shown in FIG. 3. A microprocessor controlled AC sine wave oscillator 25 generates a sine wave signal to a current drive amplifier 33 connected to the drive coil 32. The microprocessor can be a separate unit (not shown) or can be a microprocessor in one of the information processing devices

19, 23, 24. The oscillator also provides synchronized square wave signals of frequencies "f" and "nf". The current drive 26 will ensure constant current on the drive side. Changes due to the taggant 40 will occur on the sense side. The two sense windings 27 and 28 are situated in such a manner that in air there is no signal. When the metallic particles 40 are positioned inside of the coil 26, the inner sense coil 27 is more affected then the outer sense coil 28. The coils 27, 28 are connected to inputs of an instrumentation amplifier 29 that measures the difference between the two sense winding signals. A difference signal generated by the amplifier 29 is filtered by a filter 30, AC coupled and directed to an analog to digital converter 31. The signal from the oscillator 25 having the frequency "nf", typically four times a frequency of the signal "f", is applied to the converter 31.

Similar circuitry 34 is provided for a current signal from the oscillator 33. The current should be very stable. However, even small changes in the current due to power supply variation can cause variation in the return information. These effects are cancelled by normalizing the sense signal from the filter 30 with a return. The "4f" frequency signal which is synchronized at four times the sine wave frequency will provide the A/D conversion start pulses. Sampling is every 90 degrees to obtain four points for each sine wave as shown in FIG. 4 as points "p1" through "p4". Two A/D conversions, one for a current signal "Isin" and one for the sense signal "SENSE", sample at precisely the same time. The four points are used to remove any DC information and accurately calculate the amplitude and the phase of the "Isin" signal and the sense sine waves. The sense signal is divided by the current "Isin". This compensates for any deviation due to the power supply. This normalized amplitude and phase result in an electronic number proportional to the percent of taggant 40 (metallic particles) in the coil 26. It has been found that the percent of taggant 40 inside the coil 26 varies linearly. Now, the percent taggant can be calculated based on an absolute reading. The amount of taggant used and called 100% was empirically determined. This provided the starting point. To obtain a 50% mixture, 50% of the ferrous particles are mixed. Any percentage can be mixed and predicted. However the less the taggant the smaller the electronic signal.

Although four points per sine wave are shown in FIG. 4, the number of sampling points can be increased for additional harmonic information. Furthermore, other techniques such as quadrature demodulation could be used. Also, the phase of the signal can be used instead of the amplitude.

Extreme care is involved to keep the integrity of the sense signal. This includes the coils 27, 28 being designed differentially. They only return signals that are information. They are zeroed in air. They return signals proportional to the amount of the taggant filler 40. The two sensor coils "A" and "B" 21, 22 are designed physically the same. The two sensor coils 21, 22 are positioned as close as possible to each other so they both encounter the same changes in environment without being effected by the magnetic field of the other coil.

Two twisted pair of wires route the signal from the drive and from the difference of the two senses. Each twisted pair has its own shield. The two wires will see the same external events such as noise coupling etc. These two wires are fed into the instrument amplifier 29 subtracting the outer sense from the inner sense and eliminating any common mode noise. The electronics are mounted on a board with a printed circuit that routes the signals differentially. Special ground plane and shielding is used.

Special care is taken to remove electrical noise. Analog filters remove a considerable amount of noise. A notch filter is designed to remove the 60 Hz noise. High pass and low pass filters remove the aliasing type noises and unwanted frequency noise. Software filters further remove noise which has been picked up on the circuit board or at the last stage before the A/D conversion. These filters are optimized for a particular frequency.

A special 60 Hz filter algorithm has been developed to remove all 60 Hz noise. By selecting a frequency multiple of 60 Hz, it is possible to completely remove any 60 Hz related noise. 120 Hz noise is a common problem when considering high gain circuits. First, select a frequency at "n" times the test frequency. Example: 16×60=960. Gather four points (90 degrees apart) for 16 sine waves. Note these 16 sine waves correspond to 60 Hz since the frequency was defined as 16×60=960 Hz. Subtract the first point from the third point and the second point from the fourth for each of the sixteen 960 Hz sine waves. Now there are two points for each sine wave. This has removed all of the DC and there are sixteen pairs of points. By averaging the first of these points and then averaging the second for each of the sixteen 960 Hz sine waves, the 60 Hz noise is removed. Also improved is the variance by 1/sqrt(n) by averaging. Now the two points can be converted to the amplitude and phase of the signal.

Using the above techniques, the DC offset is removed from each sine wave. Averaging sixteen waveforms has the effect of reducing the variance due to random noise by 1/sqrt(16). Because the frequency was chosen to be a multiple of 60 Hz, also removed is the effect of both 60 Hz and 120 Hz. In Europe, a multiple of 50 Hz will be chosen.

Figure 5:
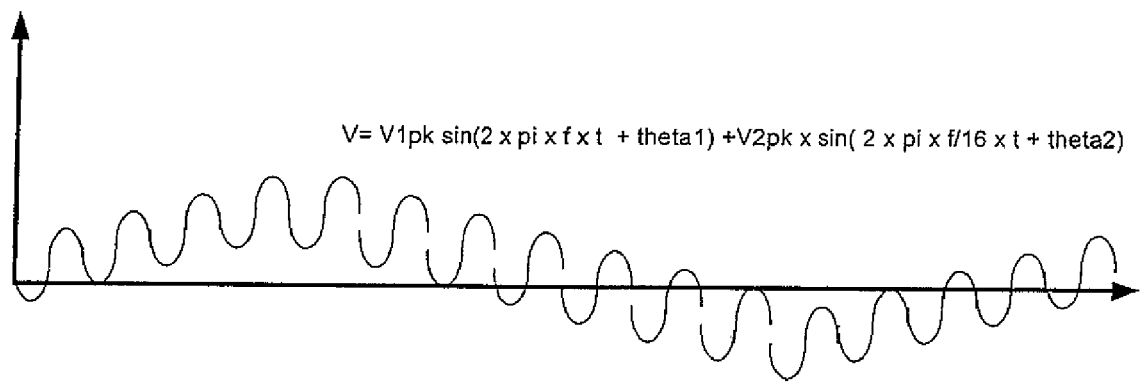
FIG. 5 is the wave form of FIG. 4 with the DC offset removed.

The waveform of sixteen sine waves shown in FIG. 5 has the DC offset removed and includes both 60 Hz and 60×16=960 Hz. As previously explained, four points are sampled for each 960 Hz waveform. Then the first, second, third and fourth points are averaged. This averaging will remove the 60 Hz, and the 120 Hz, the 240 Hz . . . until Nyquest sampling theory of less than two samples/cycle is reached. At this point other filters are removing the noise.

Automatic determination of offset: In the past the procedure would be to remove offsets caused by change in environments by manually adjusting the offset. In the system according to the present invention, the operator turns off the component "A" supply and the same material will flow through both coils 21, 22. The percent taggant should read the same for both coils. A simple calibrate offset button will remove any of the offsets. No adjustments by the operator are required.

Spacial and volumetric filter: In the past filters were all related to the frequency. The frequency has no meaning to the operator. This new algorithm will set up the filters based on the acceptable missing adhesive. For example, if one inch of missing adhesive is acceptable then a spatial filter will determine software and hardware filtering. If the operator wishes to monitor the volume flow, a volumetric filter will relate the flow rate to the frequency sampling rate etc. No knowledge of sampling theories etc. will be required.

The sampling will be related to volume flow of material or the rate of dispensing; ultimately to how much missing adhesive is allowable.

Monitoring absolute coil reading: Special algorithms will study multiple frequencies and use these frequencies to eliminate the effect of temperature. This may require fft's and regression equations to ignore temperature variation.

Figure 6:
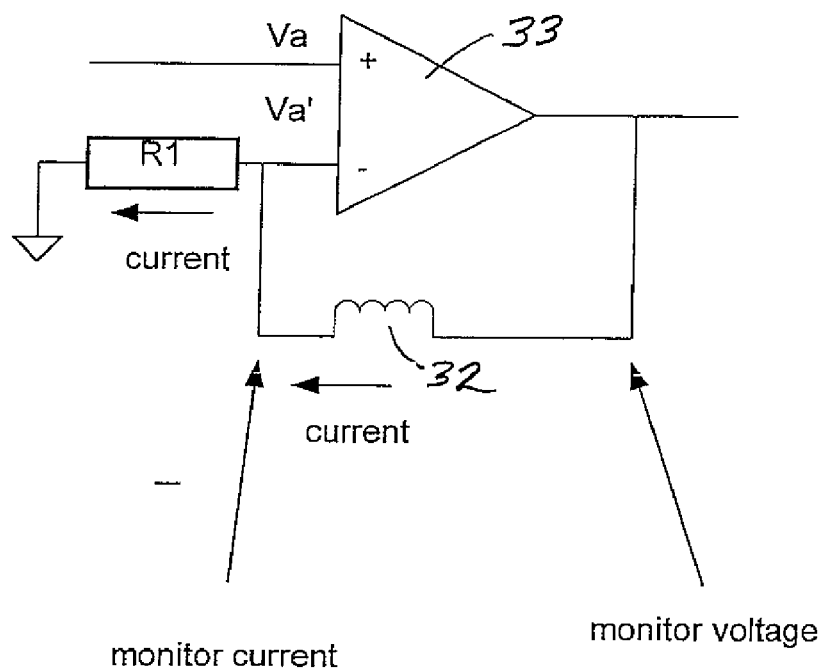
FIG. 6 is a circuit schematic of the drive amplifier shown in FIG. 3.

By monitoring the voltage on the output of the amplifier 33, see FIG. 6, it can be determined if clipping is being approached. Harmonic analysis can be used to determine if clipping is beginning. This can be used to detect changes in a malfunctioning drive.

By adding analog switches, the sense windings can be turned on and off. These switches can be added to apply voltages to the sense windings and detect changes in coil windings, broken wires and missing cables. These voltages will be used to determine if the secondary coils are correctly working.

When switching on/off the drive, extreme transients can occur, resulting in wasted time before accurate data can be taken. In the past, the turn on/off circuitry was synchronized with the oscillator frequency. The actual energy causing transients occur at non-related times based on delays in circuitry, coil resistance, capacitance and inductance. A programmable delay will switch the power on or off at the minimum transient time. This will be determined by analyses of the transients (fft's, wavelets). Removing the delay optimizes the data gathering. As shown in FIG. 3, a "D" flip flop 35 is clocked by the "f" frequency signal from the oscillator 25.

Figure 7:
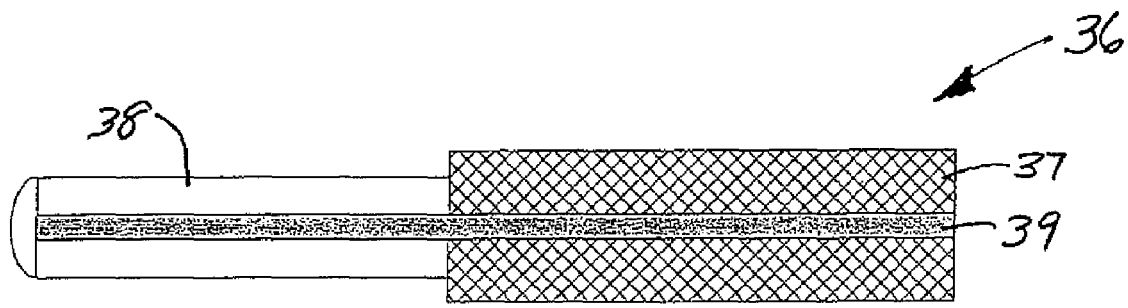
FIG. 7 is a cross sectional view of a master for the system shown in FIG. 1.

In the past, complicated masters were made using two ferrite adjustable cores. They required very stable ceramic material which was very breakable. It was sensitive with the absolute position. With the above design, the passage 26a can be filled with a master made with material similar to that used for the adhesive. In FIG. 7, there is shown a master 36 having a body with a larger diameter end 37 and a smaller diameter end 38. A core 39 extends from end to end along a longitudinal axis of the body of the master 36. The body of the master 36 can be made from a suitable material such as Delrin. The core 39 is formed of a predetermined percentage of the taggant material 40 and a filler material.

The smaller diameter portion 38 is sized to fit into the passage 26a of the sensor 26 being used as the sensor 22 for the component "B" material. The larger diameter portion 37 can be used as a handle and the smaller diameter portion 38 is inserted up to the adjacent end of the larger diameter portion 37 which functions as a stop. The larger diameter portion 37 is sized to fit into the passage 26a of the sensor 26 being used as the sensor 21 for the mixture. The smaller diameter portion 38 can be used as a handle and the larger diameter portion 37 is inserted up to the adjacent end of the smaller diameter portion 38 which functions as an indicator. Typically, the diameters of the passages 26a are sized proportionally to the percentage of the component "B" in the mixture.

The magnetic taggant system according to the present invention can be used to achieve the proper mixing of the constituents of paving and building materials such as asphalt, cement and concrete. For example, FIG. 8a is a schematic view of a magnetic taggant system 50 according to the present invention for mixing asphalt. A taggant material is supplied from a first source 51 and a material "A" is supplied from a second source 52 to a first mixer 52. The combined materials from the first mixer 52 flow through a first conduit 53 to a second mixer 54 where a material "B" is added from a third source 55. The materials are mixed to form asphalt which flows from the second mixer 54 through a second conduit 56. A first sensor 57 is provided at the first conduit 53 and a second sensor 58 is provided at the second conduit 56. The sensors 57 and 58 are operated in a manner similar to the sensors 21 and 22 of FIG. 1 to generate signals representing the mixture ratio of the materials "A" and "B". The computer system 19 can respond to the signals to generate an indication of the mixture ratio and to control the flow of the taggant material and the "A" and "B" materials.

FIG. 8b is a perspective view of a portion of the system shown in FIG. 8a. The asphalt flowing from the second mixer 54 can be used to pave a road 59, for example.

FIG. 9 is a view of a checking system 60 according to the present invention for verifying the asphalt mixture forming the road 59. The system 60 includes a computer 61, typically a portable computer, connected to one or more sensors 62 that detect the taggant material. The system 60 can be used to spot check the road 59 or be mounted on a moving vehicle (not shown) to scan the road. In this manner, the asphalt mixture can be verified and the depth of the asphalt can be determined.

Figure 10:
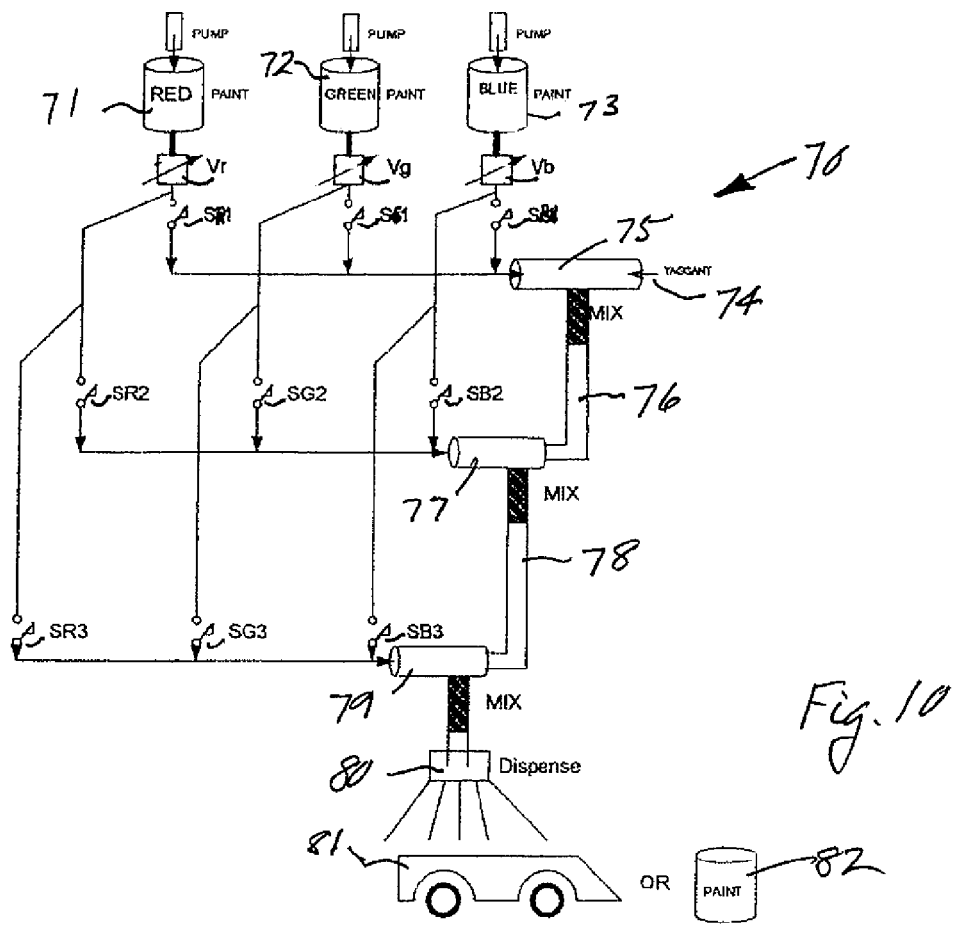
FIG. 10 is a schematic view of a paint mixing system.

The magnetic taggant system according to the present invention can be used to achieve the proper mixing of the components required to produce a desired paint color. FIG. 10 is a schematic view of a system 70 for mixing paint having, for example, three sources of paint color constituents. A red paint color source 71, a green paint color source 72 and a blue paint color source 73 have outlets connected to flow controls Vr, Vg and Vb respectively. A taggant material source 74 is connected to an inlet of a first mixer 75 having an outlet connected to a first conduit 76. The first conduit 76 is connected to an inlet of a second mixer 77 having an outlet connected to a second conduit 78. The second conduit 78 is connected to an inlet of a third mixer 79 having an outlet connected to a dispenser 80.

The paint sources 71, 72 and 73 are connected to respective inlets of the first mixer 75 by valves SR1, SG1 and SB1 respectively. The paint sources 71, 72 and 73 are connected to respective inlets of the second mixer 77 by valves SR2, SG2 and SB2 respectively. The paint sources 71, 72 and 73 are connected to respective inlets of the third mixer 79 by valves SR3, SG3 and SB3 respectively. The dispenser 80 dispenses the mixed color paint by, for example, spraying the paint on a car body 81 or filling a paint can 82.

Figure 11:
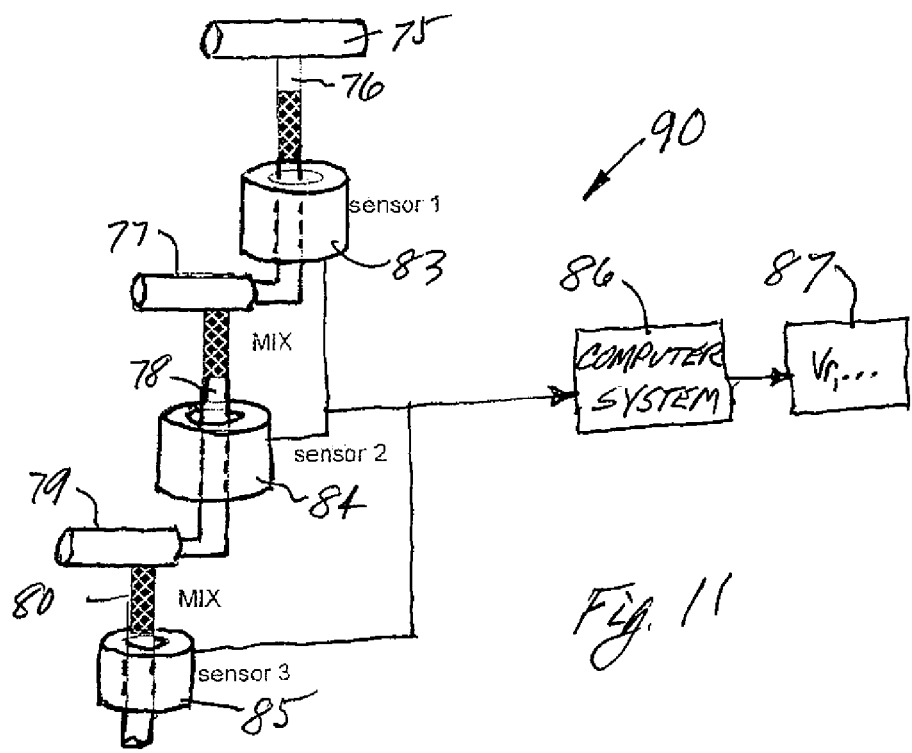
FIG. 11 is a schematic view of a magnetic taggant system for controlling the mixing of the paint in the system shown in FIG. 10.

FIG. 11 is a schematic view of a magnetic taggant system 90 for controlling the paint mixing in the system shown in FIG. 10. A first sensor 83 is provided at the first conduit 76, a second sensor 84 is provided at the second conduit 78 and a third sensor 85 is provided at the third conduit 80. The sensors 83, 84 and 85 generate signals to a computer system 86. Based upon the signals from the sensors 83, 84 and 85 and information about the desired color mix, the computer system 86 controls the operation of a plurality of devices 87 in the system 70 which includes the flow controls Vr, Vg and Vb for regulating the flow rate and the valves SR1, SG1, SB1, SR2, SG2, SB2, SR3, SG3 and SB3 for turning on and off the flow.

Additional technologies are explained below as related to Ferromagnetic Tagging (FMT). Magnetic Flux Tagging (MFT) is a more generalized description of this technology. FMT is a subset of MFT when ferrite powders are used.

I. Lab Equipment—for Measuring Mix Ratios:

1. Equipment will monitor the mixing of multiple components. A tagged material will be added to component "A". As this chemical is mixed with other materials the mix ratio will be calculated and displayed.

2. A second component "B", could also be mixed and monitored. Components "A" and "B" will have unique mix ratios. Components "A" and "B" can be mixed and its ratio can be calculated. As an example if component "A"=80% and component "B"=40% a 1:1 mixture should result in a reading of 60%.

3. Equipment will have a method to normalize any materials through mathematics. One possibility will be a linear prediction by measuring the mix ratio of two known ratios with known percentages of tagged material and then calculating a gain and offset to linear predict the mix ratio of other mixtures.

4. Equipment will have the ability to monitor a time constant of the separation of the magnetically tagged material and then predict the time constant of separation of various other materials. As an example, if the mass and specific gravity is known for the tagged material various non-metallic materials with known mass and specific gravity should have similar time constants for separation.

5. Various other laboratory aids will be included. The ability to download (or store) data at various times; for example, to monitor the separation of ferrite over time. Another possibility is to monitor a chemical; as air is removed the materials mixture will change (example—more tagged material per unit volume).

II. Monitoring of Mixing—with Chemicals which already have a Percent of Metal Present:

Mixtures may naturally have metallic powders or metallic powders are added because they provide a desired chemical effect. This will provide the same magnetic effect as the tagged material. Additional mixing of these materials can be monitored.

III. 100% Inspection—of One Component Materials:

1. One component materials such as a one component adhesive can be 100% inspected. One component is manufactured by mixing several components. Each mixture (or critical mixtures) can be monitored. After each mixture is monitored an average value and standard deviation will describe the content of the new material shipped. The customer who dispenses this material will also monitor the dispensing to ensure the mixture has not changed.

2. The addition of thixitrope (suspension stabilizer) could also be added in a known amount to allow the tagged material to separate at a known time. This would be detected by the FMT technology notifying the dispensing equipment the shelf life has been exceeded avoiding dispensing out of spec adhesives.

IV. Phase Information:

By adding a two materials such as a ferrite and aluminum adds phase information. This may allow unique footprint for the new mixture.

V. In Line Tagging:

Add a tagging mechanical mixer to mix the tagged powder with one of the two chemicals to be mixed. This would simplify retrofitting to existing systems and would not require the chemical manufacturer to add the tagged chemical.

VI. Portable or Light Industrial or Hobbist Equipment:

This technology can be easily adopted for portable, light industrial and hobbyist use. Low cost electronics is presently available. The design could be minimized to a cost effective way to monitor mix ratios.

VII. Add Ferrite—(or other Magnetic Powder) to Monitor the Flow Rate of Fluids (Example, Flow Rate of Hydraulic Fluid):

1. Add hard ferrite (or any powder which can be magnetized) to monitor flow with non-contact sensor. In previous papers we discussed detection of flow rate by magnetizing a group of particles then detecting them at a known distance from the magnetization source allowing us to determine flow rate.

2. Magnetize the powder as it passes. Use a sensor placed at a known distance. Perhaps a differential coil. Record the time between magnetizing and sensor detection. If the tube is round the volume rate will be pi$\times r^2 \times$distance/delta time.

3. By adding two sensors it may provide a more accurate measurement. Magnetize with a slow sine wave varying frequency. Then use the sensor to measure the phase. This will be the delta time required for volume calculations.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of monitoring a volume ratio of at least two components mixed together comprising the steps of:
   a. mixing a predetermined amount of ferrous taggant particles with a predetermined first volume of a first component of a building material to prepare a first mixture in a first mixing device;
   b. providing a first sensor for generating a first sense signal representing an amount of ferrous taggant particles per unit volume of the first mixture flowing into a second mixing device;
   c. mixing a predetermined second volume of a second component of the building material with the first mixture to prepare a second mixture in the second mixing device;
   d. providing a second sensor generating a second sense signal representing an amount of ferrous taggant particles per unit volume of the second mixture flowing from the second mixing device;
   e. providing a control means for calculating a ratio of the volumes of the first and second components in the second mixture in response to said first and second sense signals; and
   f. generating a sine wave test signal with a frequency of "n" times a frequency of the first and second sense signals, gathering four points ninety degrees apart for each of "n" cycles of the test signal, subtracting a first one of the points from a third one of the points and subtracting a second one of the points from a fourth one of the points to obtain a pair of points for each of the cycles, and averaging a first one of all of the pairs of points and averaging a second one of all of the pairs of points to obtain first and second averages respectively, the first and second averages representing an amplitude and phase of the first and second sense signals.

2. A method of monitoring a volume ratio of at least two components mixed together comprising the steps of:
   a. mixing a predetermined amount of ferrous taggant particles with a predetermined first volume of a first component of a building material to prepare a first mixture in a first mixing device;
   b. providing a first sensor for generating a first sense signal representing an amount of ferrous taggant particles per unit volume of the first mixture flowing into a second mixing device;
   c. mixing a predetermined second volume of a second component of the building material with the first mixture to prepare a second mixture in the second mixing device;
   d. providing a second sensor generating a second sense signal representing an amount of ferrous taggant particles per unit volume of the second mixture flowing from the second mixing device;
   e. providing a control means for calculating a ratio of the volumes of the first and second components in the second mixture in response to said first and second sense signals; and f. providing a master for calibrating the first and second sensors, the first and second sensors each having a passage through which material flows, the master having a body with a smaller diameter end sized to fit into the passages and a larger diameter end sized for use as a handle, the body further having a core formed from a filler material and a predetermined percentage of the ferrous taggant particles, and inserting the smaller diameter end into the passage of one of the first and second sensors.

3. A method of monitoring a volume ratio of at least two components mixed together comprising the steps of:
   a. mixing a predetermined amount of ferrous taggant particles with a predetermined first volume of a first color component of a coating material to prepare a first mixture in a first mixing device;
   b. providing a first sensor for generating a first sense signal representing an amount of ferrous taggant particles per unit volume of the first mixture flowing into a second mixing device;
   c. mixing a predetermined second volume of a second color component of the coating material with the first mixture to prepare a second mixture in the second mixing device;
   d. providing a second sensor generating a second sense signal representing an amount of ferrous taggant particles per unit volume of the second mixture flowing from the second mixing device; and
   e. providing a control means for calculating a ratio of the volumes of the first and second components in the second mixture in response to said first and second sense signals to determine a color of the second mixture; and
   g. generating a sine wave test signal with a frequency of "n" times a frequency of the first and second sense signals, gathering four points ninety degrees apart for each of "n" cycles of the test signal, subtracting a first one of the points from a third one of the points and subtracting a second one of the points from a fourth one of the points to obtain a pair of points for each of the cycles, and averaging a first one of all of the pairs of points and averaging a second one of all of the pairs of points to obtain first and second averages respectively, the first and second averages representing an amplitude and phase of the first and second sense signals.

4. A method of monitoring a volume ratio of at least two components mixed together comprising the steps of:
   a. mixing a predetermined amount of ferrous taggant particles with a predetermined first volume of a first color component of a coating material to prepare a first mixture in a first mixing device;
   b. providing a first sensor for generating a first sense signal representing an amount of ferrous taggant particles per unit volume of the first mixture flowing into a second mixing device;
   c. mixing a predetermined second volume of a second color component of the coating material with the first mixture to prepare a second mixture in the second mixing device;
   d. providing a second sensor generating a second sense signal representing an amount of ferrous taggant particles per unit volume of the second mixture flowing from the second mixing device;
   e. providing a control means for calculating a ratio of the volumes of the first and second components in the second mixture in response to said first and second sense signals to determine a color of the second mixture; and
   f. providing a master for calibrating the first and second sensors, the first and second sensors each having a passage through which material flows, the master having a body with a smaller diameter end sized to fit into the passages and a larger diameter end sized for use as a handle, the body further having a core formed from a filler material and a predetermined percentage of the ferrous taggant particles, and inserting the smaller diameter end into the passage of one of the first and second sensors.

* * * * *